United States Patent
Kang et al.

(10) Patent No.: US 9,554,121 B2
(45) Date of Patent: Jan. 24, 2017

(54) 3D SCANNING APPARATUS AND METHOD USING LIGHTING BASED ON SMART PHONE

(71) Applicant: ELECTRONICS AND TELECOMMUNICATIONS RESEARCH INSTITUTE, Daejeon (KR)

(72) Inventors: Hyun Kang, Daejeon (KR); Jae-Hean Kim, Sejong (KR); Chang-Joon Park, Daejeon (KR); Jin-Sung Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/000,419

(22) Filed: Jan. 19, 2016

(65) Prior Publication Data
US 2016/0227196 A1    Aug. 4, 2016

(30) Foreign Application Priority Data

Jan. 30, 2015  (KR) .................. 10-2015-0015260
Jan. 6, 2016  (KR) .................. 10-2016-0001773

(51) Int. Cl.
*H04N 1/04*    (2006.01)
*H04N 13/02*   (2006.01)
*H04N 13/00*   (2006.01)

(52) U.S. Cl.
CPC ...... *H04N 13/0253* (2013.01); *H04N 13/0018* (2013.01); *H04N 13/0257* (2013.01); *H04N 13/0296* (2013.01); *H04N 2013/0077* (2013.01)

(58) Field of Classification Search
CPC ............ H04N 5/23219; H04N 5/23296; H04N 5/2224; H04N 7/15; H04N 7/181; H04N 5/23203; H04N 5/23261; H04N 7/18; H04N 5/247; H04N 13/0022; H04N 13/0203; H04N 17/002; H04N 5/222; H04N 5/23241
(Continued)

(56) References Cited

U.S. PATENT DOCUMENTS

2005/0022669 A1* 2/2005 Xu ............... B01D 46/0004
                                                95/273
2010/0156935 A1   6/2010 Lim et al.
(Continued)

FOREIGN PATENT DOCUMENTS

KR   10-2014-0062252 A   5/2014
KR   10-2015-0060020 A   6/2015
WO   2013/165440 A1     11/2013

OTHER PUBLICATIONS

Douglas Lanman et al., "Build Your Own 3D Scanner: 3D Photography for Beginners," SIGGRAPH 2009 Course Notes, 2009.

*Primary Examiner* — Negussie Worku
(74) *Attorney, Agent, or Firm* — LRK Patent Law Firm

(57) ABSTRACT

A 3D scanning apparatus and method using lighting based on a smart phone. The 3D scanning apparatus includes: an image capturing unit for capturing the image of a 3D object using a camera and a lighting apparatus installed in a terminal; an image processing unit for generating a color-enhanced image corresponding to the light emitted by the lighting apparatus; and a scanning unit for scanning the 3D object in 3D by extracting a scan area from the color-enhanced image based on the light and by extracting position information corresponding to the scan area.

16 Claims, 11 Drawing Sheets

(58) Field of Classification Search
USPC .... 358/1.9, 505, 518; 348/E7.085, 152, 143, 348/169, 135, E7.083, 14.05, 14.08, 14.1, 348/14.16, 159, 162, 222.1, 46, 47, 78; 382/103, 100, 106, 107; 482/1
See application file for complete search history.

(56) References Cited

U.S. PATENT DOCUMENTS

| | | | |
|---|---|---|---|
| 2010/0158352 A1* | 6/2010 | Yu | G06T 7/2033 382/154 |
| 2010/0158353 A1* | 6/2010 | Kim | G06T 7/0022 382/154 |
| 2010/0245593 A1* | 9/2010 | Kim | G06T 7/0018 348/188 |
| 2011/0228097 A1* | 9/2011 | Motta | H04N 5/33 348/164 |
| 2012/0162441 A1* | 6/2012 | Kim | G06T 7/0018 348/187 |
| 2012/0257825 A1* | 10/2012 | Yoo | G06T 5/005 382/167 |
| 2012/0281087 A1 | 11/2012 | Kruse | |
| 2013/0271744 A1 | 10/2013 | Miller et al. | |
| 2013/0341486 A1 | 12/2013 | Oh et al. | |
| 2014/0111616 A1 | 4/2014 | Blayvas | |
| 2014/0204244 A1* | 7/2014 | Choi | H04N 5/23222 348/231.99 |
| 2014/0253592 A1* | 9/2014 | Cho | G06T 19/006 345/633 |
| 2015/0145957 A1 | 5/2015 | Son et al. | |
| 2015/0207962 A1* | 7/2015 | Sugimoto | H04N 19/117 382/261 |
| 2015/0271415 A1* | 9/2015 | Uemura | H04N 5/23296 348/222.1 |
| 2015/0279016 A1* | 10/2015 | Kim | H04N 13/0253 382/154 |
| 2015/0356336 A1* | 12/2015 | Hoobler | G06K 7/089 235/455 |
| 2015/0378433 A1* | 12/2015 | Savastinuk | G06K 9/00255 345/156 |
| 2015/0379695 A1* | 12/2015 | Naruse | H04N 1/409 348/234 |
| 2016/0078680 A1* | 3/2016 | Reif | G06T 7/0044 345/633 |

* cited by examiner

210

3D SCANNING APPARATUS AND METHOD USING LIGHTING BASED ON SMART PHONE

CROSS REFERENCE TO RELATED APPLICATION

This application claims the benefit of Korean Patent Application Nos. 10-2015-0015260 and 10-2016-0001773, filed Jan. 30, 2015 and Jan. 6, 2016, which are hereby incorporated by reference in their entirety into this application.

BACKGROUND OF THE INVENTION

1. Technical Field

The present invention generally relates to 3D scanning technology using lighting based on a smart phone and, more particularly, to 3D scanning technology capable of scanning a 3D object in 3D using a camera and a lighting apparatus that are installed in a smart phone.

2. Description of the Related Art

Currently released 3D scanners are expensive devices, and are used only by experts. Existing 3D scanners require complicated software and special hardware such as contact-type, laser optical, or structured light hardware. However, with the development of 3D printing technology, technical requirements for simple scanning and printing are in demand, in addition to requirements in the reverse engineering field.

A mobile 3D scanner may use Time Of Flight (TOF) scanning, photometric scanning, or laser optical scanning. In TOF scanning, 3D data are acquired by measuring changes in an infrared pattern that is projected onto an object using a separate infrared camera and a small infrared pattern projector. However, this method has disadvantages in that the hardware is expensive and the precision of data is limited by the resolution of the camera. In photometric scanning, a pair of similar images is extracted from among two or more images obtained by capturing an object, and 3D data are acquired using a method based on triangulation. This method has an advantage in that the hardware is inexpensive, but the precision and scanning quality are inferior because complete information about the points that form the shape of the object is not acquired.

In contrast, in laser optical scanning, relatively cheap hardware is used and 3D data are obtained by analyzing the curve of a laser projected onto an object, thus being advantageous in that a high degree of precision may be realized. However, this method has a disadvantage in that the object must be repeatedly scanned, in comparison with TOF scanning or photometric scanning. Laser optical scanning may be categorized into a method in which a camera is fixed and an object is scanned while being rotated and a camera tracking method, which uses a camera that is capable of scanning while moving. In the case of the method in which a camera is fixed, there are disadvantages in that a repetitive setting process is required in order to rotate an object and inaccurate scanning may result from inconsistently orienting the camera and the laser. Conversely, the camera tracking method may overcome the weak point of the method in which a camera is fixed, but requires a camera tracking algorithm in order to realize a high degree of precision.

SUMMARY OF THE INVENTION

An object of the present invention is to provide a 3D scanning method that is easy for laypersons by enabling a user to freely capture the image of a 3D object from every direction using a camera and a lighting apparatus installed in a smartphone.

Another object of the present invention is to acquire 3D scanning information at lower cost than when using existing technology by providing a 3D scanning apparatus based on laser optical scanning using an inexpensive lighting apparatus.

A further object of the present invention is to improve the convenience of a 3D scanning apparatus by using a common camera tracking engine, which is easily replaceable.

In order to accomplish the above object, a 3D scanning apparatus using lighting based on a smart phone according to the present invention includes: an image capturing unit for capturing an image of a 3D object based on a camera and a lighting apparatus installed in a terminal; an image processing unit for generating a color-enhanced image corresponding to light, emitted by the lighting apparatus, based on the captured image of the 3D object, and extracting position information corresponding to a scan area based on the color-enhanced image; and a tracking engine unit for estimating rotation and movement of the terminal by combining one or more of information about a sensor of the terminal and a change in the image, which occurs in response to movement of the camera and the lighting apparatus.

The image processing unit may generate the color-enhanced image, in which, among colors included in the captured image, a single color corresponding to the light is enhanced, by performing color model conversion for the colors of the captured image based on a characteristic of the light.

The image processing unit may extract multiple subpixels corresponding to the scan area from multiple pixels corresponding to the light in the color-enhanced image and extract position information corresponding to the multiple subpixels.

The image processing unit may detect a rising edge and a falling edge in the color-enhanced image based an two kinds of one-dimensional Gaussian circuits, and extract the multiple subpixels from the multiple pixels by calculating a weighted sum of pixels included in an area satisfying a predetermined condition between the rising edge and the falling edge.

The image capturing unit may include a calibration unit for calibrating at least one of the camera and the lighting apparatus based on a predetermined calibration board, and a camera tracking adjustment unit for adjusting a coordinate system of a camera tracking engine to match a coordinate system of the camera on which the calibration has been performed.

The calibration unit may estimate a marker plane of the predetermined calibration board based on at least one of an image, obtained by capturing the predetermined calibration board along with the light using the camera, and a camera parameter, obtained by calibrating the camera, and may estimate a plane equation corresponding to the light based on the marker plane.

The tracking engine unit may consecutively output a parameter corresponding to at least one of a position and a posture of the terminal in 3D space by combining the captured image with the information about the sensor of the terminal while the moving terminal captures the image of the 3D object.

The image processing unit may remove noise from the color-enhanced image using a noise rejection filter.

The light may be used diversely based on at least one of a type of the single color and a shape of the light depending on a kind of the lighting apparatus.

Also, a 3D scanning method using lighting based on a smart phone according to an embodiment of the present invention includes: capturing an image of a 3D object based on a camera and a lighting apparatus installed in a terminal; generating a color-enhanced image corresponding to light, emitted by the lighting apparatus, based on the captured image of the 3D object, and extracting position information corresponding to a scan area based on the color-enhanced image; and estimating rotation and movement of the terminal by combining one or more of information about a sensor of the terminal and a change of the image, which occurs in response to movement of the camera and the lighting apparatus.

Extracting the position information may be configured to generate the color-enhanced image, in which, among colors included in the captured image, a single color corresponding to the light is enhanced, by performing color model conversion for the colors of the captured image based on a characteristic of the light.

Extracting the position information may comprise: extracting multiple subpixels corresponding to the scan area from multiple pixels corresponding to the light in the color-enhanced image; and extracting position information corresponding to the multiple subpixels.

Extracting the multiple subpixels may comprise: detecting a rising edge and a falling edge in the color-enhanced image based on two kinds of one-dimensional Gaussian circuits; and extracting the multiple subpixels from the multiple pixels by calculating a weighted sum of pixels included in an area satisfying a predetermined condition between the rising edge and the falling edge.

Capturing the image of the 3D object may comprise: calibrating at least one of the camera and the lighting apparatus based on a predetermined calibration board; and adjusting a coordinate system of a camera tracking engine to match a coordinate system of the camera on which the calibration has been performed.

Calibrating at least one of the camera and the lighting apparatus may comprise: estimating a marker plane of the predetermined calibration board based on at least one of an image, obtained by capturing the predetermined calibration board along with the light using the camera, and a camera parameter, obtained by calibrating the camera; and estimating a plane equation corresponding to the light based on the marker plane.

Estimating the rotation and the movement of the terminal may be configured to output a parameter corresponding to at least one of a position and a posture of the terminal in 3D space by combining the captured image with the information about the sensor of the terminal while the moving terminal captures the image of the 3D object.

Extracting the position information may further comprise removing noise from the color-enhanced image using a noise rejection filter.

The light may be used diversely based on at least one a type of the single color and a shape of the light depending on a kind of the lighting apparatus.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
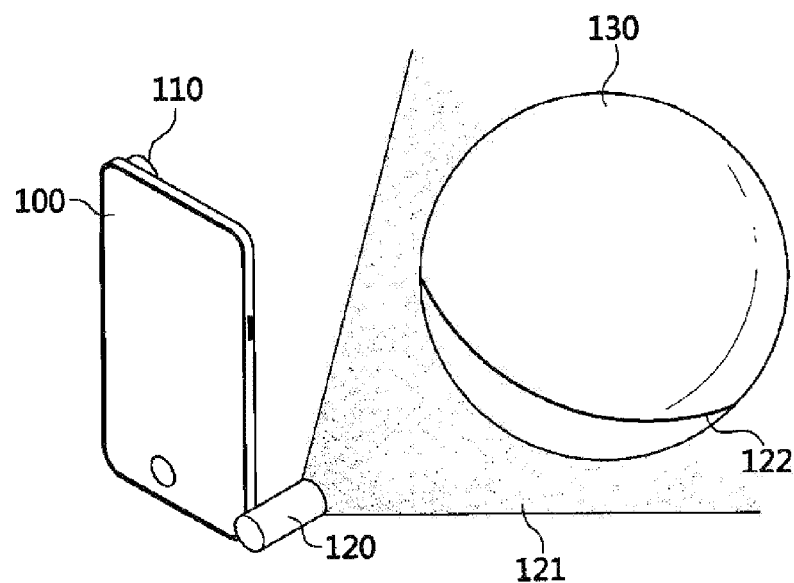
FIG. 1 is a view illustrating an example in which a 3D object is scanned in 3D using a smart phone equipped with a 3D scanning apparatus according to the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a view illustrating an example in which a 3D object is scanned in 3D using a smart phone equipped with a 3D scanning apparatus according to the present invention.

Referring to FIG. 1, a 3D object 130 may be scanned in 3D by capturing the image of the 3D object 130 using a smart phone 100 equipped with a camera 110 and a lighting apparatus 120.

Here, the smart phone 100 may include a 3D scanning apparatus for scanning the 3D object 130 in 3D.

Here, the 3D scanning apparatus may operate in three operation modes, that is, a calibration mode for calibrating the camera 110 and the lighting apparatus 120, a camera tracking engine information collection mode for using a camera tracking engine, and a 3D scanning mode for performing 3D scanning.

In this case, the object of the calibration mode may be to collect information about the camera 110 and the lighting apparatus 120. Calibration may be performed using a common calibration board or software for calibration, but because the present invention needs to acquire a plane equation for light, a special calibration board is used to acquire the 3D position and posture of the camera 110 and the lighting apparatus 120.

Here, calibrating a camera is the most fundamental process in image processing, and may mean technology for extracting fundamental factors of the camera that performs the image making process. This image making process may be a process in which an actual object in real space is projected onto an image plane or the film plane of a camera. In other words, the process in which a point on the 3D object in the real world, which is (x, y, z), makes an image on the film plane (u, v) in the camera may be represented as an equation through the image making process. Here, the position of the camera in 3D space, the direction of rotation, the characteristics of the camera lens and the like are called external factors or internal factors of the camera, and calibrating the camera is the process of estimating these factors.

Also, simultaneously with the calibration of the camera, the position and posture of the plane formed by lighting may be detected through calibration of the lighting apparatus 120. In this case, the light emitted by the lighting apparatus 120 may be presented as a visual straight line and a 3D plane 121 formed by the lens of the lighting apparatus 120. In this case, the plane equation for the 3D plane 121 may be acquired using the special calibration board according to the present invention, and a description pertaining thereto will be made later with reference to FIG. 4.

Also, the object of the camera tracking engine information collection mode is to set a camera tracking engine, which is necessary in order to capture the image of the 3D object 130 while a user is moving the smart phone 100.

The camera tracking engine may output parameters about the position and posture of the smart phone 100 by combining information about the sensor of the smart phone 100 with the image obtained while the 3D object 130 is captured using the camera 110.

In this case, because the process of calibrating the camera 110 is independently performed, it is necessary to match the world coordinate system, represented by the camera tracking engine, with a 3D scanning system, which is the world coordinate system of the camera, and the camera tracking engine information collection mode may be used for this.

Also, the object of the 3D scanning mode may be to extract 3D geometric information about the 3D object 130 by analyzing the curved section of the light line 122, formed by the light that reaches the 3D object 130, as shown in FIG. 1. Here, the 3D scanning mode is the mode that is performed last upon 3D scanning, and may be the most frequently performed mode. The above-described calibration mode or camera tracking engine information collection mode may be a mode that precedes 3D scanning.

In this case, because the light output from the lighting apparatus 120 to the 3D object 130 has a single unique color and forms the 3D plane 121, it may be detected in the image captured by the camera 110.

Also, in the 3D scanning mode, all of three software engines used in the present invention can be used. In other words, in addition to the above-mentioned camera tracking engine, a real-time image processing engine and a light image analysis engine can be used.

Here, in the case of the real-time image processing engine, functions that receive images as inputs may consume many resources. Accordingly, these functions need to be optimized in order to realize real-time processing throughout the entire system. Therefore, the present invention may include an algorithm for extracting the light line 122, formed by the light represented on the image, in real time.

The light image analysis engine may be the most important part of the present invention, and the performance of the entire system may be decided based on the performance of the light image analysis engine.

Figure 2:
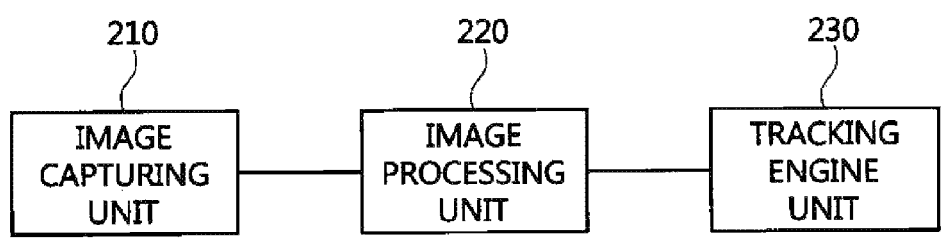
FIG. 2 is a block diagram illustrating a 3D scanning apparatus according to an embodiment of the present invention.

FIG. 2 is a block diagram illustrating a 3D scanning apparatus according to an embodiment of the present invention.

Referring to FIG. 2, the 3D scanning apparatus according to an embodiment of the present invention includes an image capturing unit 210, an image processing unit 220, and a tracking engine unit 230.

The image capturing unit 210 captures the image of a 3D object based on a camera and a lighting apparatus, installed in a terminal.

Here, the terminal may be a mobile device that includes various mobile communication specifications, such as a Portable Multimedia Player (PMP), a Mobile Internet Device (MID), a smart phone, a tablet PC, a notebook, a netbook, a Personal Digital Assistant (PDA), an information communication device, or the like.

In this case, the lighting apparatus emits light having a single color, and the light passes through a lens and is output in the form of a 3D plane. Accordingly, the light may be detected in the image captured by the camera.

Here, depending on the kind of the lighting apparatus, the single color and the shape of the light may be varied. For example, with respect to the single color, a lighting apparatus that emits red light or a lighting apparatus that emits green light may be used. Also, with respect to the shape of light, a lighting apparatus that outputs a single straight light beam, a lighting apparatus that outputs two or more straight light beams, a lighting apparatus that outputs multiple straight light beams based on a slit, or a lighting apparatus that outputs light in the manner of a projector may be used.

In this case, at least one of the camera and the lighting apparatus may be calibrated using a predetermined calibration board.

Here, the calibration of the camera may be a process of estimating external or internal factors of the camera. For example, when (x, y, z), which is a point in the 3D world, is converted into (u, v), which is a point in a 2D plane that is the image captured by the camera, the position of the camera in the real 3D world, the direction of rotation, the characteristics of the camera lens and the like may be estimated.

Also, the calibration of the lighting apparatus may be a process of estimating the position and posture of the lighting apparatus, which emits light, and the estimation may be performed using a special calibration board.

Here, the marker plane of the predetermined calibration board is estimated based on at least one of an image obtained by capturing the predetermined calibration board along with the light using the camera and a camera parameter obtained by calibrating the camera, and then a plane equation corresponding to the light may be estimated based on the marker plane.

For example, after focusing the center line of the light, emitted by the lighting apparatus, on a blank area of the calibration board, in which the marker is not located, the image of the light may be captured along with the image of the marker fixed on the calibration board using the camera. Then, the marker is separated from the image captured by the camera, and the center of the marker and the ID of the marker group may be extracted. Subsequently, the light line may be detected using information about the color included in the image. In this case, the calibration of the camera may be performed using Tsai's method, which is a well-known method, and the marker plane of the calibration board may be estimated using the internal and external factors of the camera, estimated during the calibration of the camera. Then, the factors of the plane equation may be estimated using the equation pertaining to marker plane, marker planes obtained through multiple captured images, and the least squares method from an unknown plane.

In this case, the coordinate system of the camera tracking engine may be adjusted to match the coordinate system of the camera on which calibration has been performed.

In this case, the camera tracking engine may track the movement of the user who performs 3D scanning, that is, the movement of the smart phone.

Here, because the calibration of the camera is performed independently, it is necessary to match the world coordinate system, represented by the camera tracking engine, with the scanning system, which is the world coordinate system of the camera. To this end, the process of initializing the camera tracking engine may be performed, and this process may be performed differently for each camera tracking engine. Also, points at which 2D coordinates of natural features intersect the light line displayed on the 3D object may be collected from among the information output from the camera tracking engine, and may be used as information for calculating the difference between the world coordinate systems.

In this case, in consideration of the noise of natural features and error that may occur when extracting the light, outliers are removed using Random Sample Consensus (RANSAC), and the spatial difference between remaining points may be calculated using the least squares method. In other words, outlying data that deviate from a normal distribution may be removed.

The image processing unit 220 generates a color-enhanced image corresponding to the light emitted by the lighting apparatus based on the captured image of the 3D object and extracts position information corresponding to a scan area based on the color-enhanced image. For example, if the color of the light emitted by the lighting apparatus is red, a red-enhanced image, in which red is enhanced so as to appear prominently in the captured image, is generated, and the position information corresponding to the scan area may be extracted.

In this case, color model conversion is performed for the color of the captured image based on the characteristic of the light, whereby a color-enhanced image, in which a single color corresponding to the light, among the colors included in the captured image, is enhanced, may be generated. For example, if the light corresponds to red, the color-enhanced image may be a red-enhanced image, in which red, among the colors included in the captured image, is enhanced.

In this case, the color model conversion may be a process in which the color of the captured image is converted from RGB (Red, Green, Blue) format into YUV (Y, Cb, Cr) format, and the coordinates of the captured image are converted into UV coordinates corresponding to the YUV format.

For example, if the color-enhanced image is a red-enhanced image, the pixels of the image may have values closer to 1 as being closer to red, whereas the pixels may have values closer to 0 as being further from red. Here, the red-enhanced image may be determined based on the reciprocal of the distance from the UV coordinates (−0.25, 0.5), which corresponds to red, to a point in the UV coordinates on which the U-axis and V-axis are perpendicular to each other in the color space corresponding to the YUV format. The equation for calculating the coordinates of the red-enhanced image is represented as the following Equation (1):

$$f(U,V)=1-\alpha*\sqrt{(U+0.25)^2+(V-0.25)^2} \quad (1)$$

where $\alpha$ may denote the reciprocal of the distance from the coordinates corresponding to red to the coordinates that are the furthest therefrom in the UV space.

In this case, multiple subpixels corresponding to the scan area are extracted from multiple pixels corresponding to the light displayed on the color-enhanced image, and position information corresponding to the multiple subpixels may be extracted.

In this case, when imaging the light as a pixel value included in the image, the result may correspond to an area rather than a single pixel. For example, if the color-enhanced image is a red-enhanced image, an area in which multiple subpixels corresponding to red light are distributed in the image may be determined as the scan area.

In this case, in order to improve the performance of 3D scanning, subpixels may be extracted from the multiple pixels.

Specifically, a rising edge and a falling edge are detected in the color-enhanced image based on two kinds of one-dimensional Gaussian circuits, and the weighted sum is calculated for the pixels included in the area satisfying a predetermined condition between the rising edge and the falling edge, whereby multiple subpixels may be extracted.

In this case, in order to extract the subpixels, a method in which the weighted sum is calculated from the row and column of the image may be used. This method may have less noise, but have a problem in that positional accuracy is deteriorated because two or more scan areas, which are areas corresponding to the light, may exist in the areas of the row and column.

If the two kinds of one-dimensional Gaussian circuits are used, the rising edge and the falling edge may be detected and displayed in the color-enhanced image, and the area satisfying the predetermined condition between the rising edge and the falling edge may be set as a scan area, whereby it is possible to solve the problem in which positional accuracy is deteriorated. Here, the predetermined condition may be determined depending on the single color corresponding to the light.

Also, because the function that uses the Gaussian circuit may be quickly processed by the Accelerate Framework of iOS, it is advantageous from the aspect of operation time.

In this case, noise may be removed from the color-enhanced image using a noise rejection filter. Generally, because the human eye is sensitive to green, a camera sensor is manufactured to realize green resolution that is higher than red and blue resolution. Accordingly, the color-enhanced image generated based on Equation (1) may have a lot of noise, and thus the noise may be removed from the color-enhanced image using the noise rejection filter.

In this case, in order to minimize the effect of the noise, filtering may be performed again by applying the noise rejection filter to the output value of the function f (U, V). Here, according to an experiment, a function that calculates scalar multiplication on each input area may have a better result than a COS function. Also, if the distance function f (U, V) is modified, it may be applied to various kinds of lighting apparatuses. However, the lighting apparatus corresponding to a 640 nm LED laser may be cheaper than lighting apparatuses corresponding to 380 nm, 470 nm, and 518 nm LED lasers.

The tracking engine unit 230 estimates the rotation and movement of a terminal by combining one or more of the information about the sensor of the terminal and a change of the image in response to the movement of the camera and lighting apparatus.

Specifically, while the moving terminal is capturing the image of the 3D object, the captured image and the sensor information are combined, whereby a parameter corresponding to at least one of the position and posture of the terminal in the 3D space may be output. This output data may be recorded in an additional storage module after 3D scanning has been completed, and may be input for bundle adjustment in an offline environment.

In this case, the bundle adjustment may globally optimize 2D information about all of the images recorded in the storage module and 3D information generated based on the 2D information. A value that represents the position and posture of the camera, modified depending on the result of this optimization, may be used to modify the 3D scan points through the triangulation of the 2D coordinates of the light represented on the image and the 3D plane formed by the light. In this case, the 3D scan points for the image may correct the vibration of the camera tracking engine, thus improving the precision of the 3D scan points.

Also, although not illustrated in FIG. 2, the 3D scanning apparatus according to an embodiment of the present invention may further include a storage unit for storing information generated to correspond to 3D scanning.

As described above, the use of the 3D scanning apparatus according to the present invention enables the provision of a 3D scanning apparatus based on laser optical scanning using an inexpensive lighting apparatus, whereby 3D scanning information may be obtained at less expense than when using existing technology.

Figure 3:
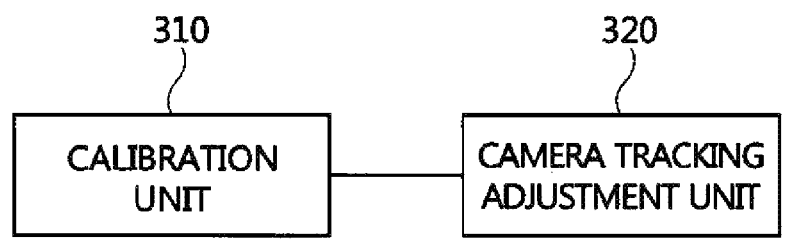
FIG. 3 is a block diagram illustrating an example of the image capturing unit illustrated in FIG. 2.

FIG. 3 is a block diagram illustrating an example of the image capturing unit illustrated in FIG. 2.

Referring to FIG. 3, the image capturing unit 210 illustrated in FIG. 2 includes a calibration unit 310 and a camera tracking adjustment unit 320.

The calibration unit 310 calibrates at least one of a camera and a lighting apparatus based on a predetermined calibration board.

Here, the calibration of the camera may be a process of estimating external and internal factors of the camera. For example, when (x, y, z), which is a point in the 3D world, is converted into (u, v), which is a point in the 2D plane that is the image captured by the camera, the position of the camera in the real 3D world, the direction of rotation, the characteristics of the camera lens and the like may be estimated.

Also, the calibration of the lighting apparatus may be a process of estimating the position and posture of the lighting apparatus, which emits light, and the estimation may be performed using a special calibration board.

In this case, the marker plane of the predetermined calibration board is estimated based on at least one of an image, obtained by capturing the predetermined calibration board along with light using the camera, and a camera parameter, obtained by calibrating the camera, and then a plane equation corresponding to the light may be estimated based on the marker plane.

For example, after focusing the center line of the light, emitted by the lighting apparatus, on a blank area of the calibration board, in which the marker is not located, the image of the light may be captured along with the image of the marker fixed on the calibration board using the camera. Then, the marker is separated from the image captured by the camera, and the center of the marker and the ID of the marker group may be extracted. Subsequently, the light line may be detected using information about the color in the image. In this case, the calibration of the camera may be performed using Tsai's method, which is a well-known method, and the marker plane of the calibration board may be estimated using the internal and external factors of the camera, which are estimated by calibrating the camera. Then, the factors of the plane equation may be estimated using the equation pertaining to the marker plane, marker planes obtained through multiple captured images, and the least squares method from an unknown plane.

The camera tracking adjustment unit 320 adjusts the coordinate system of the camera tracking engine to match the coordinate system of the camera on which calibration has been performed.

In this case, the camera tracking engine may track the movement of the user who performs 3D scanning, that is, the movement of the smart phone. In other words, while the 3D object is captured using the terminal, the camera tracking engine may output a value corresponding to the position of the terminal in 3D space by continuously tacking it. The output data may be recorded in an additional storage module after 3D scanning has been completed, and may be input for bundle adjustment in an offline environment.

In this case, the bundle adjustment may globally optimize 2D information about all of the images recorded in the storage module and 3D information generated based on the 2D information. A value that represents the position and posture of the camera, modified based on the result of this optimization, may be used to modify the 3D scan points through the triangulation of the 2D coordinates of the light represented on the image and the 3D plane formed by the light. In this case, the 3D scan points for the image may correct the vibration of the camera tracking engine, thus improving the precision of the 3D scan points.

In this case, because the calibration of the camera is performed independently, it is necessary to match the world coordinate system, represented by the camera tracking engine, with the scanning system, which is the world coordinate system of the camera. To this end, the process of initializing the camera tracking engine may be performed, and this process may be performed differently for each camera tracking engine. Also, points at which the 2D coordinates of natural features intersect the light line displayed on the 3D object may be collected from among the information output from the camera tracking engine, and may be used as information for calculating the difference between the world coordinate systems.

In this case, in consideration of the noise of natural features and error that may occur when extracting the light, outliers are removed using Random Sample Consensus (RANSAC), and the spatial difference between remaining points may be calculated using the least squares method. In other words, outlying data that deviate from a normal distribution may be removed.

Figure 4:
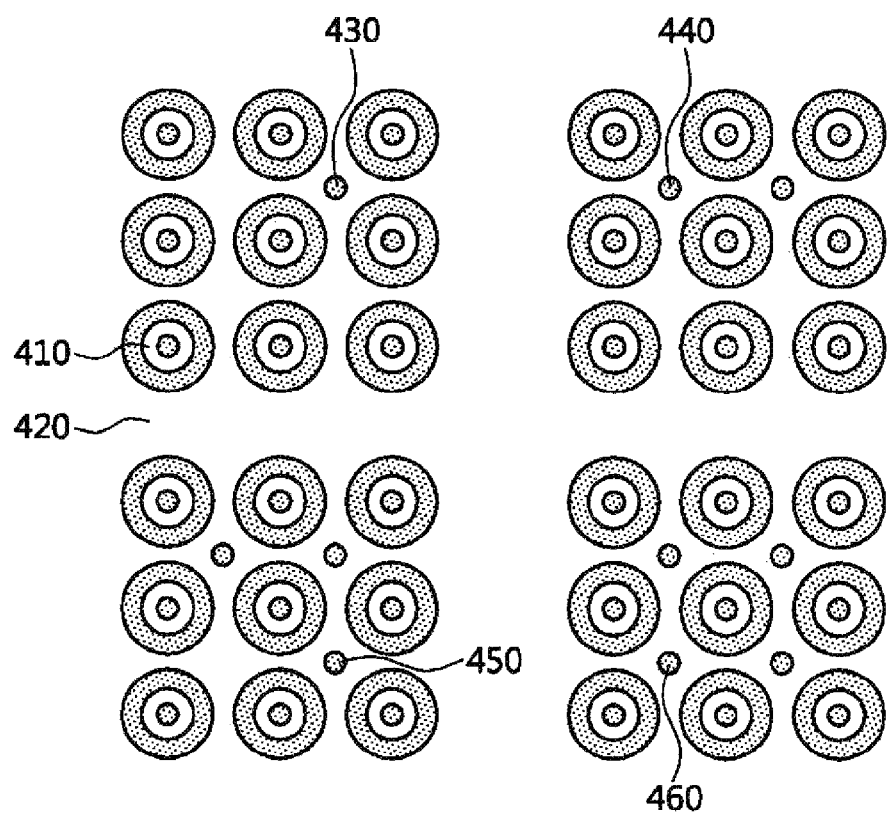
FIG. 4 is a view illustrating an example of a calibration board according to the present invention.

FIG. 4 is a view illustrating an example of a calibration board according to the present invention.

Referring to FIG. 4, while performing calibration of a camera based on the calibration board according to the present invention, a plane equation of the light may be acquired.

In this case, light may be output in such a way that the center line of the light, emitted by the lighting apparatus, is located in the blank area 420 of the calibration board, in which no marker exists.

Then, the image of a concentric circle marker 410 fixed on the calibration board may be captured along with the image of the light using the camera.

Subsequently, the concentric circle marker 410 is separated from the image captured by the camera, and the center of the concentric circle marker and the IDs 430, 440, 450, and 460 of concentric circle groups may be extracted.

Then, a light line may be detected using information about the color in the image. In this case, the calibration of the camera may be performed using Tsai's method, which is a well-known method, and the marker plane of the calibration board may be estimated using the internal and external factors of the camera, estimated through calibration of the camera.

Then, the factors of the plane equation may be estimated using the equation pertaining to the marker plane, marker planes obtained through multiple captured images, and the least squares method from an unknown plane.

Figure 5:
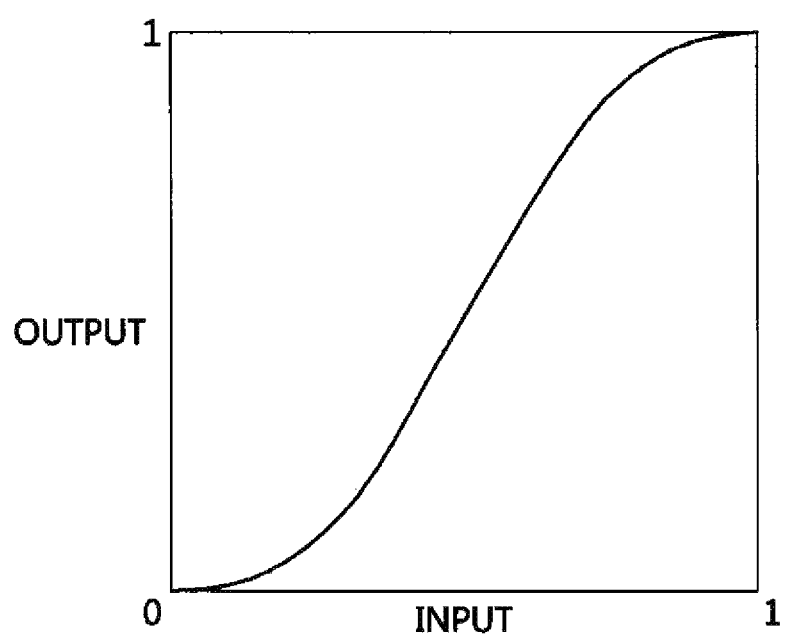
FIG. 5 is a view illustrating an example of a noise rejection filter according to the present invention.

FIG. 5 is a view illustrating an example of a noise rejection filter according to the present invention.

Referring to FIG. 5, the noise rejection filter according to the present invention may be used to remove noise from a color-enhanced image.

Generally, because the human eye is sensitive to green, a camera sensor is manufactured to realize green resolution that is higher than red and blue resolution. There may be a lot of noise in the color-enhanced image generated based on the function f (U, V), and thus the noise may be removed from the color-enhanced image using the noise rejection filter illustrated in FIG. 5.

In this case, in order to minimize the effect of noise, filtering may be performed again by applying the noise rejection filter to the output value of the function f (U, V).

Referring to FIG. 5, the X-axis (input) of the noise rejection filter may indicate the output value of the function f (U, V). Also, the Y-axis (output) may indicate a value that is output when the output value of the function f (U, V) is input.

Therefore, the noise may be removed from the color-enhanced image by correcting the color-enhanced image using the output value corresponding to the Y-axis.

Figure 6:
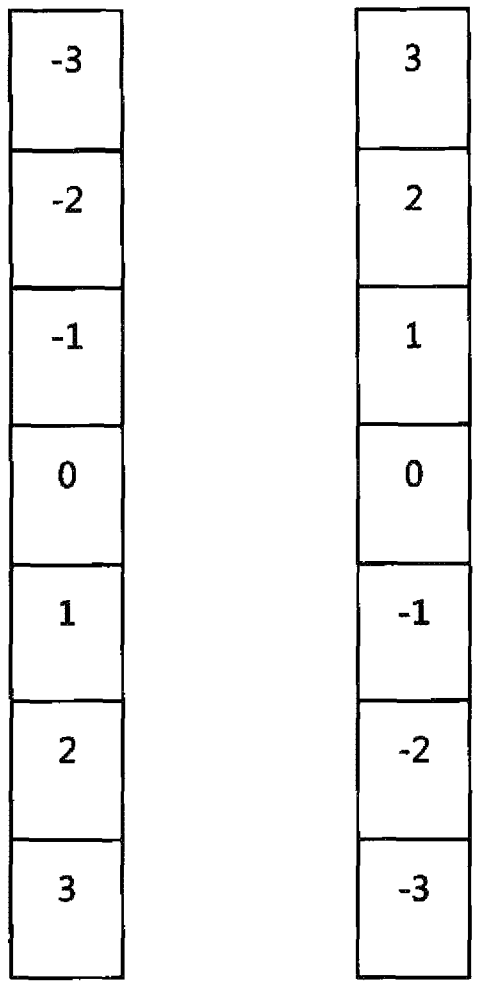
FIG. 6 is a view illustrating two kinds of one-dimensional Gaussian circuits according to the present invention.

FIG. 6 is a view illustrating two kinds of one-dimensional Gaussian circuits according to the present invention.

Referring to FIG. 6, the two kinds of one-dimensional Gaussian circuits according to the present invention may respectively correspond to a one-dimensional Gaussian circuit for detecting a rising edge and a one-dimensional Gaussian circuit for detecting a falling edge.

In this case, the circuit illustrated on the left side of FIG. 6 is the one-dimensional Gaussian circuit for detecting a rising edge, and the circuit illustrated on the right side of FIG. 6 is the one-dimensional Gaussian circuit for detecting a falling edge.

These two one-dimensional Gaussian circuits may be used in the process of acquiring a weighted sum for extracting subpixels corresponding to the light from the color-enhanced image, and may solve the problem whereby two or more scan areas may exist in the process of acquiring the weighted sum.

FIGS. 7 to 10 are views illustrating the shape of light according to an embodiment of the present invention.

FIGS. 7 to 10 show various shapes of light according to an embodiment of the present invention.

In other words, the light that can be applied to the present invention may have various embodiments relating to the color or the shape thereof.

For example, according to the kind of lighting apparatus, the color of the light may be red or green, and red and green may be used alternatively according to the circumstances. Also, the light may be generated using a LED and a narrow slit, or alternatively, a projector may be used.

Figure 7:
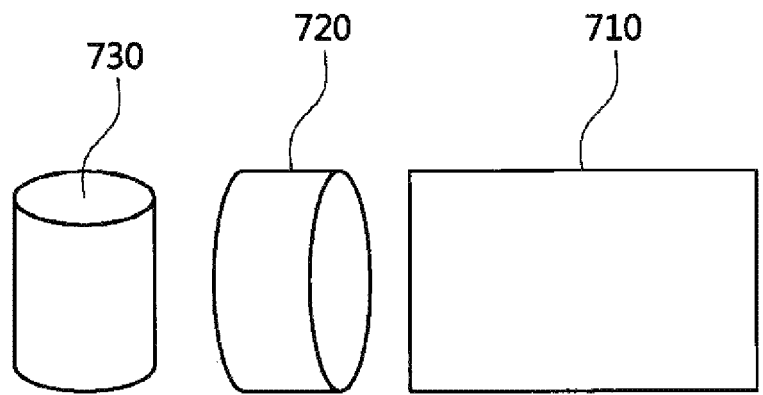
FIGS. 7 to 10 are views illustrating the shape of light according to an embodiment of the present invention.

FIG. 7 shows the configuration in which one straight light beam may be generated by a lighting apparatus 710, a lens 720, and a cylinder lens 730. Referring to FIG. 7, the lighting apparatus 710 may correspond to an LED, a laser light-source apparatus, or the like, and may serve to emit light having a wavelength corresponding to a single color. Also, the lens 720 may collect light emitted by the lighting apparatus 710, or may send it away, and the cylinder lens 730 may stretch a point light source into a straight light beam.

Figure 8:
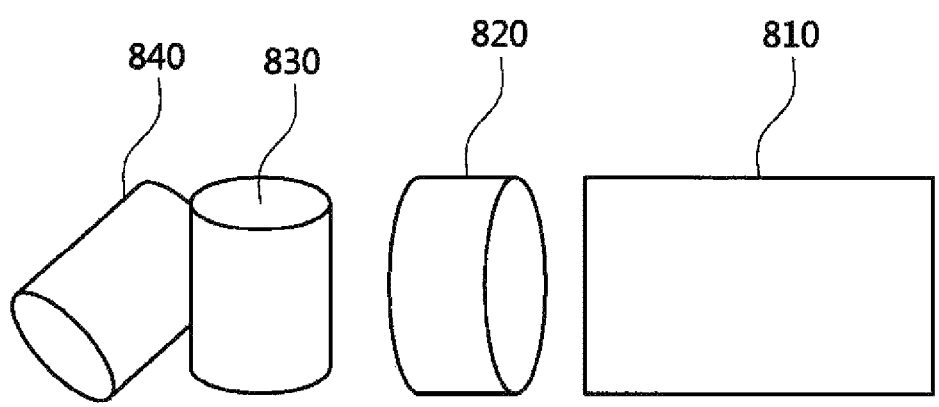

FIG. 8 shows the configuration in which two cylinder lenses 830 and 840 are combined to form two or more straight light beams. In this case, the cylinder lens 840 may serve to send a point light source in the form of straight light beams in various directions.

Figure 9:
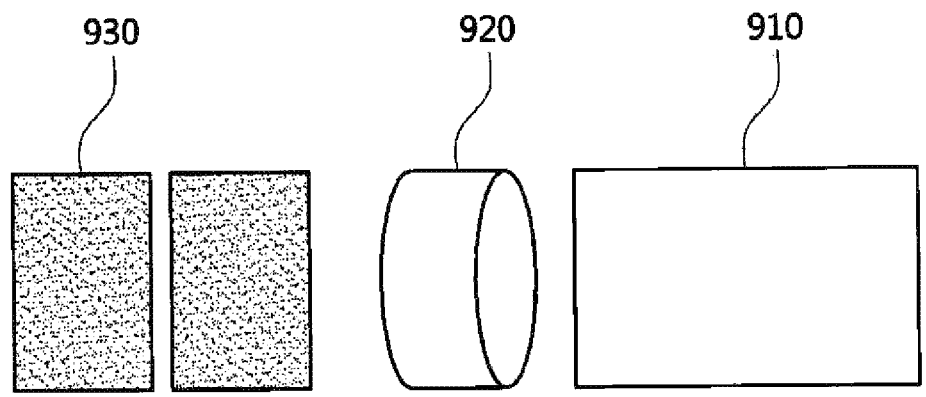

FIG. 9 shows the configuration in which multiple straight light beams may be made using a narrow slit 930. Here, the slit 930 may serve to convert the light that has passed through the lens 920 into a narrow line-like beam of light.

Figure 10:
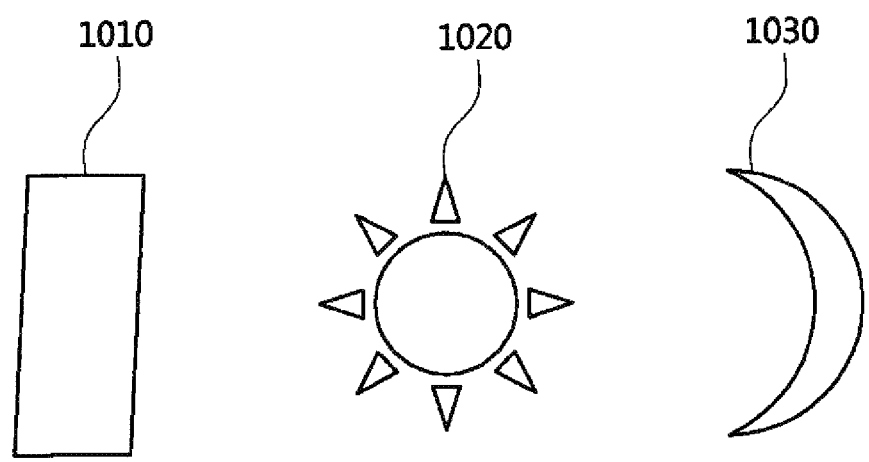

FIG. 10 shows the configuration in which light may be made in the manner of a projector, which differs from the configurations of FIGS. 7 to 9. For example, the configuration shown in FIG. 10 may include an element for making an image used for a projector, such as an LED display 1010 or a Digital Micro mirror Device (DMD), and optical units 1020 and 1030, which include a light source for the projector, a lens, a mirror, and the like.

In addition to the light generated through the configurations illustrated in FIGS. 7 to 10, various shapes of light may be used. Here, whether the various shapes of light can be used may be decided by checking whether the light may be separated from the image, the cost and battery consumption of the lighting apparatus, whether the size of the lighting apparatus is suitable for installation in a smart phone, and the like.

Figure 11:
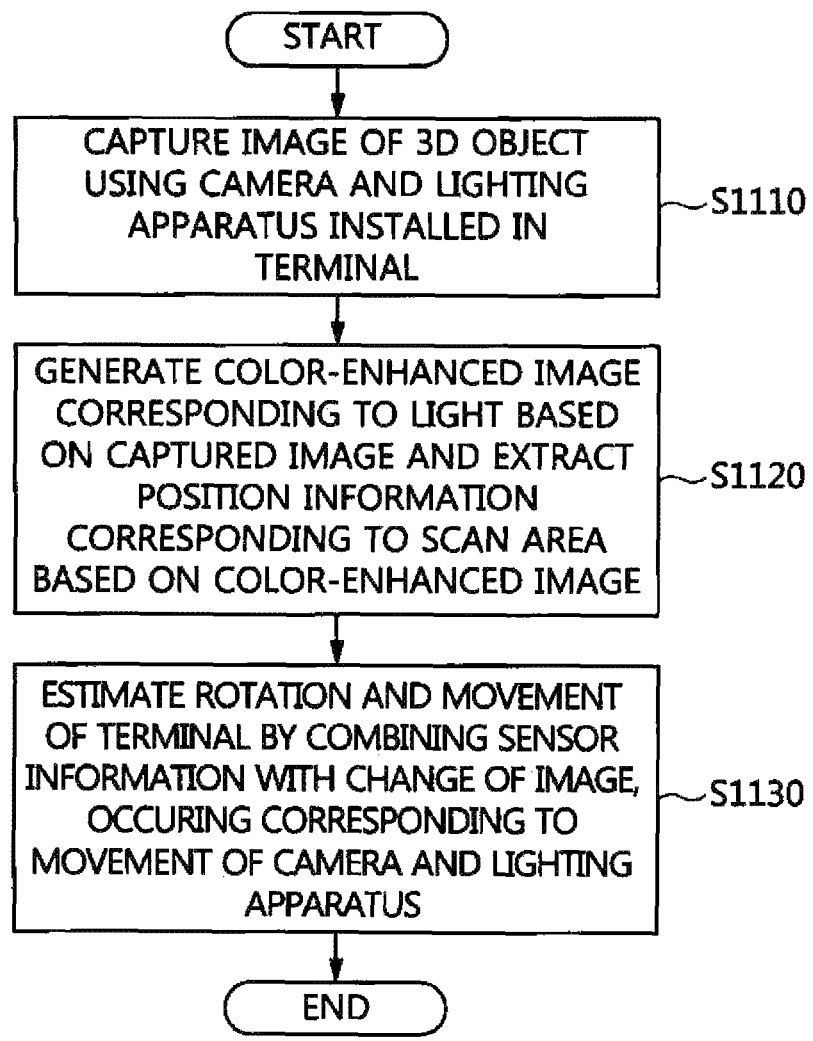
FIG. 11 is a flowchart illustrating a 3D scanning method using lighting based on a smart phone according to an embodiment of the present invention.

FIG. 11 is a flowchart illustrating a 3D scanning method using lighting based on a smart phone according to an embodiment of the present invention.

Referring to FIG. 11, in the 3D scanning method using lighting based on a smart phone according to an embodiment of the present invention, the image of a 3D object is captured using a camera and a lighting apparatus, installed in the smart phone, at step S1110.

In this case, the terminal may be one of various kinds of mobile devices, such as a Portable Multimedia Player (PMP), a Mobile Internet Device (MID), a smart phone, a tablet PC, a notebook, a netbook, a Personal Digital Assistant (FDA), an information communication device, or the like.

In this case, the lighting apparatus emits light having a single color, and the light passes through a lens and is output in the form of a 3D plane. Accordingly, the light may be detected in the image captured by the camera.

Here, depending on the kind of the lighting apparatus, the single color and the shape of the light may be varied. For example, with respect to the single color, a lighting apparatus that emits red light or a lighting apparatus that emits green light may be used. Also, with respect to the shape of light, a lighting apparatus that outputs a single straight light beam, a lighting apparatus that outputs two or more straight light beams, a lighting apparatus that outputs multiple straight light beams based on a slit, or a lighting apparatus that outputs light in the manner of a projector may be used.

In this case, at least one of the camera and the lighting apparatus may be calibrated based on a predetermined calibration board.

Here, the calibration of the camera may be a process of estimating external or internal factors of the camera. For example, when (x, y, z), which is a point in the 3D world, is converted into (u, v), which is a point in a 2D plane that is the image captured by the camera, the position of the camera in the real 3D world, the direction of rotation, the characteristics of a camera lens and the like may be estimated.

Also, the calibration of the lighting apparatus may be a process of estimating the position and posture of the lighting apparatus, which emits light, and the estimation may be performed using a special calibration board.

In this case, the marker plane of the predetermined calibration board is estimated based on at least one of an image obtained by capturing the predetermined calibration board along with the light using the camera and a camera parameter obtained by calibrating the camera, and then a plane equation corresponding to the light may be estimated based on the marker plane.

For example, after focusing the center line of the light, emitted by the lighting apparatus, on a blank area of the calibration board, in which the marker is not located, the image of the light may be captured along with the image of the marker fixed on the calibration board using the camera. Then, the marker is separated from the image captured by the camera, and the center of the marker and the ID of a marker group may be extracted. Subsequently, the light line may be detected using information about the color included in the image. In this case, the calibration of the camera may be performed using Tsai's method, which is a well-known method, and the marker plane of the calibration board may be estimated using the internal and external factors of the camera, estimated through calibration of the camera. Then, the factors of the plane equation may be estimated using the equation pertaining to the marker plane, marker planes obtained through multiple captured images, and the least squares method from an unknown plane.

In this case, the coordinate system of the camera tracking engine may be adjusted to match the coordinate system of the camera on which calibration has been performed.

In this case, the camera tracking engine may track the movement of the user who performs 3D scanning, that is, the movement of the smart phone.

Here, because the calibration of the camera is performed independently, it is necessary to match the world coordinate system, represented by the camera tracking engine, with the scanning system, which is the world coordinate system of the camera. To this end, the process of initializing the camera tracking engine may be performed, and this process may be performed differently for each camera tracking engine. Also, points at which the 2D coordinates of natural features intersect the light line displayed on the 3D object may be collected from among the information output from the camera tracking engine, and may be used as information for calculating the difference between the world coordinate systems.

In this case, in consideration of the noise of natural features and error that may occur when extracting the light, outliers are removed using Random Sample Consensus (RANSAC), and the spatial difference between remaining points may be calculated using the least squares method. In other words, outlying data that deviate from a normal distribution may be removed.

Also, in the 3D scanning method using lighting based on a smart phone according to an embodiment of the present invention, a color-enhanced image corresponding to the light emitted by the lighting apparatus is generated based on the captured image of the 3D object, and position information corresponding to a scan area is extracted from the color-enhanced image at step S1120. For example, if the light emitted by the lighting apparatus is red, a red-enhanced image, in which red is enhanced so as to appear prominently in the captured image, is generated and the position information corresponding to a scan area may be extracted.

In this case, color model conversion is performed for the color of the captured image based on the characteristic of the light, whereby a color-enhanced image, in which the single color corresponding to the light, among the colors included in the captured image, is enhanced, may be generated. For example, if the color of the light is red, the color-enhanced image may be a red-enhanced image in which red, among the colors included in the captured image, is enhanced.

Here, the color model conversion may be a process in which the color of the captured image is converted from RGB (Red, Green, Blue) format into YUV (Y, Cb, Cr) format and the coordinates of the captured image are converted into UV coordinates corresponding to the YUV format.

For example, if the color-enhanced image is a red-enhanced image, the pixels of the image may have values closer to 1 as being closer to red, whereas the pixels may have values closer to 0 as being further from red. Here, the red-enhanced image may be determined based on the reciprocal of the distance from the UV coordinates (−0.25, 0.5), which corresponds to red, to the point in the UV coordinates on which the U-axis and V-axis are perpendicular to each other in the color space corresponding to the YUV format. The equation for calculating the coordinates of the red-enhanced image is represented as the following Equation (1):

$$f(U,V)=1-a*\sqrt{(U+0.25)^2+(V-0.25)^2} \qquad (1)$$

where a may denote the reciprocal of the distance from the coordinates corresponding to red to the coordinates that are the furthest therefrom in the UV space.

In this case, multiple subpixels corresponding to the scan area are extracted from multiple pixels corresponding to the light represented in the color-enhanced image, and position information corresponding to the multiple subpixels may be extracted.

In this case, when imaging the light as a pixel value included in the image, the result may correspond to an area rather than a single pixel. For example, if the color-enhanced image is a red-enhanced image, an area in which multiple subpixels corresponding to red light are distributed in the image may be determined as a scan area.

In this case, in order to improve the performance of 3D scanning, the subpixels may be extracted from the multiple pixels.

Specifically, a rising edge and a falling edge are detected in the color-enhanced image based on two kinds of one-dimensional Gaussian circuits, and the weighted sum is calculated for the pixels included in the area satisfying a predetermined condition between the rising edge and the falling edge, whereby the multiple subpixels may be extracted.

In this case, in order to extract the subpixels, a method in which the weighted sum is calculated from the row and column of the image may be used. This method may have less noise, but may have a problem in which positional accuracy is deteriorated because two or more scan areas, which are areas corresponding to the light, may exist in the areas of the row and column.

Therefore, if the two kinds of one-dimensional Gaussian circuits are used, the rising edge and the falling edge may be detected and displayed in the color-enhanced image, and the area satisfying the predetermined condition between the rising edge and the falling edge may be set as a scan area, whereby it is possible to solve the problem in which the positional accuracy is deteriorated. Here, the predetermined condition may be determined depending on the single color corresponding to the light.

Also, because the function that uses the Gaussian circuit may be quickly processed by the Accelerate Framework of iOS, it is advantageous from the aspect of operation time.

In this case, noise may be removed from the color-enhanced image using a noise rejection filter. Generally, because the human eye is sensitive to green, a camera sensor is manufactured to realize green resolution that is higher than red and blue resolution. Accordingly, the color-enhanced image generated based on Equation (1) may have a lot of noise, and thus the noise may be removed from the color-enhanced image using the noise rejection filter.

In this case, in order to minimize the effect of the noise, filtering may be performed again by applying the noise rejection filter to the output value of the function f (U, V). In this case, according to an experiment, a function that calculates scalar multiplication for each input area may have a better result than a COS function. Also, if the distance function f (U, V) is modified, it may be applied to various kinds of lighting apparatuses. However, the lighting apparatus corresponding to a 640 nm LED laser may be cheaper than lighting apparatuses corresponding to 380 nm, 470 nm, and 518 nm LED lasers.

Also, in the 3D scanning method using lighting based on a smart phone according to an embodiment of the present invention, the rotation and movement of a terminal is estimated by combining one or more of the information about the sensor of the terminal and a change of the image in response to the movement of the camera and lighting apparatus at step S1130.

In this case, the captured image and the sensor information are combined while the moving terminal is capturing the image of the 3D object, whereby a parameter corresponding to at least one of the position and posture of the terminal in the 3D space may be output. This output data may be recorded in an additional storage module after 3D scanning has been completed, and may be input for bundle adjustment in an offline environment.

In this case, the bundle adjustment may globally optimize 2D information about all of the images recorded in the storage module and 3D information generated based on the 2D information. A value that represents the position and posture of the camera, modified depending on the result of this optimization, may be used to modify the 3D scan points through the triangulation of the 2D coordinates of the light represented on the image and the 3D plane formed by the light. In this case, the 3D scan points for the image may correct the vibration of the camera tracking engine, thus improving the precision of the 3D scan points.

Also, although not illustrated in FIG. 11, in the 3D scanning method using lighting based on a smart phone according to an embodiment of the present invention, information generated to correspond to 3D scanning may be stored in a storage module.

As described above, through the 3D scanning method according to the present invention, a 3D scanning method that is easy for laypersons may be provided.

Figure 12:
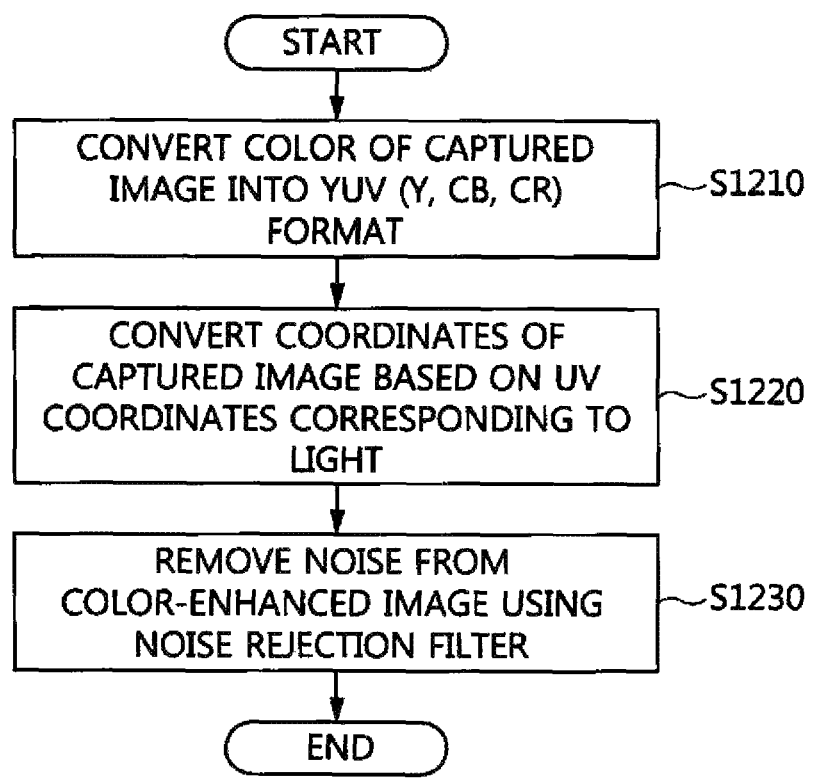
FIG. 12 is a flowchart specifically illustrating the process of generating a color-enhanced image in the 3D scanning method illustrated in FIG. 11.

FIG. 12 is a flowchart specifically illustrating the process of generating a color-enhanced image in the 3D scanning method illustrated in FIG. 11.

Referring to FIG. 12, in the process of generating a color-enhanced image in the 3D scanning method illustrated in FIG. 11, the color of the captured image is converted from RGB (Red, Green, Blue) format into YUV (Y, Cb, Cr) format at step S1210.

Here, the YUV format is a way of representing a color using one luma component (Brightness, Y) and two chrominance components, U and V.

Then, the coordinates of the captured image are converted based on the UV coordinates, on which the U-axis and V-axis are perpendicular to each other in the color space corresponding to the YUV format, at step S1220.

In this case, the pixels of the captured image may have values closer to 1 as being closer to the single color corresponding to the light, whereas they may have values closer to 0 as being further from the single color corresponding to the light.

For example, if the color-enhanced image is a red-enhanced image, the pixels of the image may have values closer to 1 as being closer to red, whereas the pixels may have values closer to 0 as being further from red. Here, the red-enhanced image may be determined based on the reciprocal of the distance from the UV coordinates (−0.25, 0.5), which correspond to red, to the point in the UV coordinates, on which the U-axis and V-axis are perpendicular to each other in the color space corresponding to the YUV format. The equation for calculating the coordinates of the red-enhanced image is represented as the following Equation (1):

$$f(U,V)=1-a)*\sqrt{(U+0.25)^2+(V-0.25)^2} \quad (1)$$

where a may denote the reciprocal of the distance from the coordinates corresponding to red to the coordinates that are the furthest therefrom in the UV space.

Then, noise is removed from the color-enhanced image using a noise rejection filter at step S1230. In this case, in order to minimize the effect of the noise, filtering may be performed again by applying the noise rejection filter to the output value of the function f (U, V).

Figure 13:
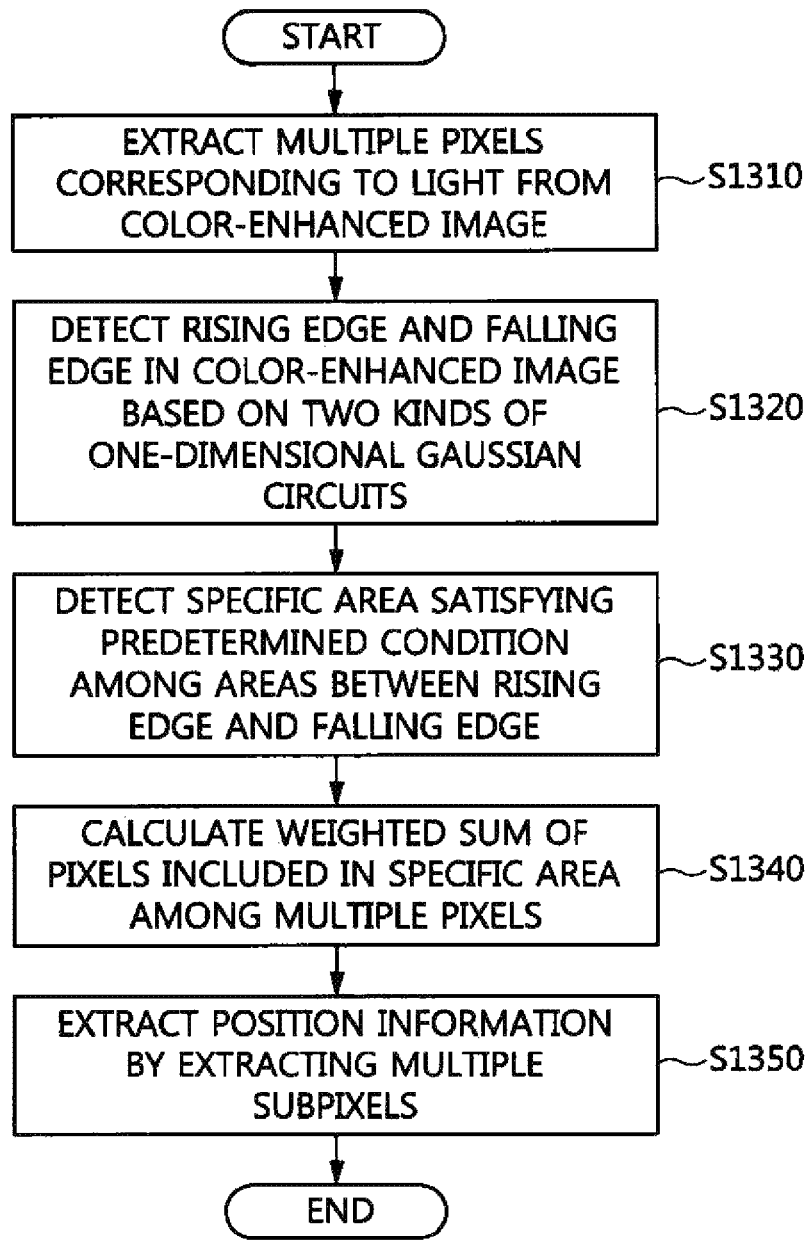
FIG. 13 is a flowchart specifically illustrating the process of extracting position information about a scan area in the 3D scanning method illustrated in FIG. 11.

FIG. 13 is a flowchart specifically illustrating the process of extracting position information about the scan area in the 3D scanning method illustrated in FIG. 11.

Referring to FIG. 13, in the process of extracting position information about the scan area in the 3D scanning method illustrated in FIG. 11, multiple pixels corresponding to the light are extracted from the color-enhanced image at step S1310. For example, if the color-enhanced image is a red-enhanced image, multiple pixels corresponding to the red light may be extracted from the image.

Then, a rising edge and a falling edge are detected in the color-enhanced image based on two kinds of one-dimensional Gaussian circuits at step S1320. Here, the rising edge and the falling edge may respectively correspond to the first part and the last part of the area corresponding to the light.

Subsequently, a specific area satisfying a predetermined condition is detected in the area between the rising edge and the falling edge at step S1330. For example, if the color-enhanced image is a red-enhanced image, an area corresponding to the red light, which is a scan area, may be detected in the area between the rising edge and the falling edge.

Then, multiple subpixels are extracted from the multiple pixels by calculating the weighted sum for the pixels included in the scan area at step S1340, and position information corresponding to the multiple subpixels is extracted at step S1350.

In this case, the position information corresponding to the multiple subpixels may be extracted based on the camera tracking engine. In other words, the position information corresponding to the multiple subpixels may be acquired based on the data output from the camera tracking engine.

Figure 14:
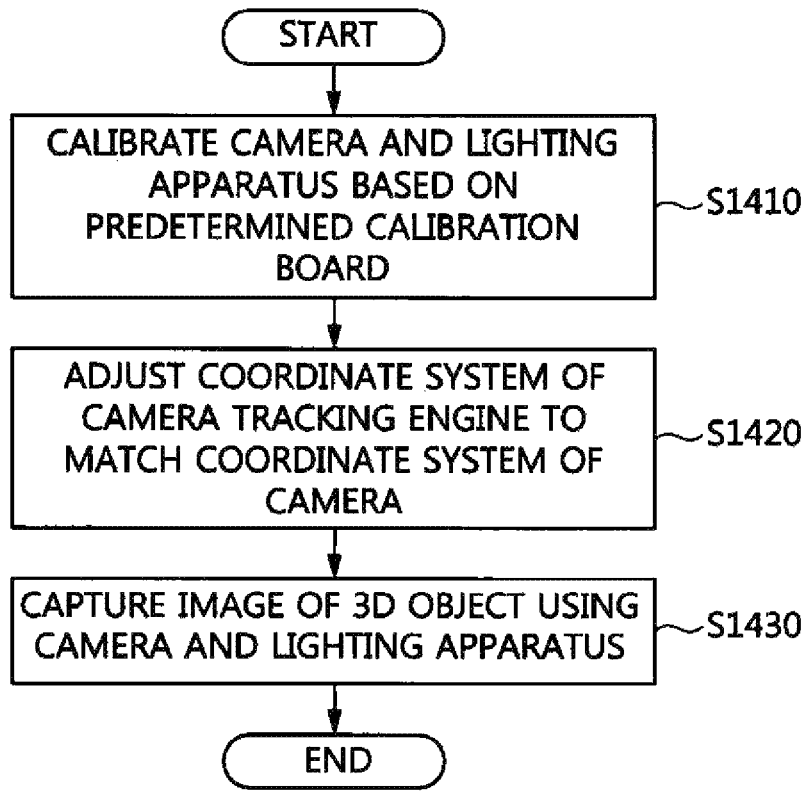
FIG. 14 is a flowchart specifically illustrating the process of capturing the image of a 3D object in the 3D scanning method illustrated in FIG. 11.

FIG. 14 is a flowchart specifically illustrating the process of capturing the image of a 3D object in the 3D scanning method illustrated in FIG. 11.

Referring to FIG. 14, in the process of capturing the image of a 3D object in the 3D scanning method illustrated in FIG. 11, a camera and a lighting apparatus are calibrated using a predetermined calibration board at step S1410.

Here, calibrating the camera may be the process of estimating external factors or internal factors of the camera. For example, when (x, y, z), which is a point in the 3D world, is converted into (u, v), which is a point in a 2D plane that is the image captured by the camera, the position of the camera in the real 3D world, the direction of rotation, the characteristics of the camera lens and the like may be estimated.

Also, calibrating the lighting apparatus may be the process of estimating the position and posture of the lighting apparatus, which emits light, and the estimation may be performed using a special calibration board.

In this case, the marker plane of the predetermined calibration board is estimated based on at least one of an image, obtained by capturing the predetermined calibration board along with the light using the camera, and a camera parameter, obtained by calibrating the camera, and then a plane equation corresponding to the light may be estimated based on the marker plane.

Then, at step S1420, the coordinate system of the camera tracking engine is adjusted to match the coordinate system of the camera on which calibration has been performed.

In this case, the camera tracking engine may track the movement of the user who performs 3D scanning, which is the movement of the smart phone.

In this case, the camera tracking engine may output a parameter corresponding to at least one of the position and the posture of the terminal in the 3D space by combining the captured image with information about the sensor while the image of the 3D object is captured using the terminal. This output data may be recorded in an additional storage module after 3D scanning has been completed, and may be input for bundle adjustment in an offline environment.

In this case, the bundle adjustment may globally optimize 2D information about all of the images recorded in the storage module and 3D information generated based on the 2D information. A value that represents the position and posture of the camera, modified depending on the result of this optimization, may be used to modify the 3D scan points through the triangulation of the 2D coordinates of the light represented on the image and the 3D plane formed by the light. In this case, the 3D scan points for the image may correct the vibration of the camera tracking engine, thus improving the precision of the 3D scan points.

In this case, because the calibration of the camera is performed independently, it is necessary to match the world coordinate system, represented by the camera tracking engine, with the scanning system, which is the world coordinate system of the camera. To this end, the process of initializing the camera tracking engine may be performed, and this process may be performed variously depending on the camera tracking engine. Also, points at which the 2D coordinates of natural features intersect the light line displayed on the 3D object may be collected from among the information output from the camera tracking engine, and may be used as information for calculating the difference between the world coordinate systems.

In this case, in consideration of the noise of natural features and error that may occur when extracting the light, outliers are removed using Random Sample Consensus (RANSAC), and the spatial difference between remaining points may be calculated using the least squares method. In other words, outlying data that deviate from a normal distribution may be removed.

Subsequently, the image of the 3D object is captured using the camera and the lighting apparatus at step S1430.

Figure 15:
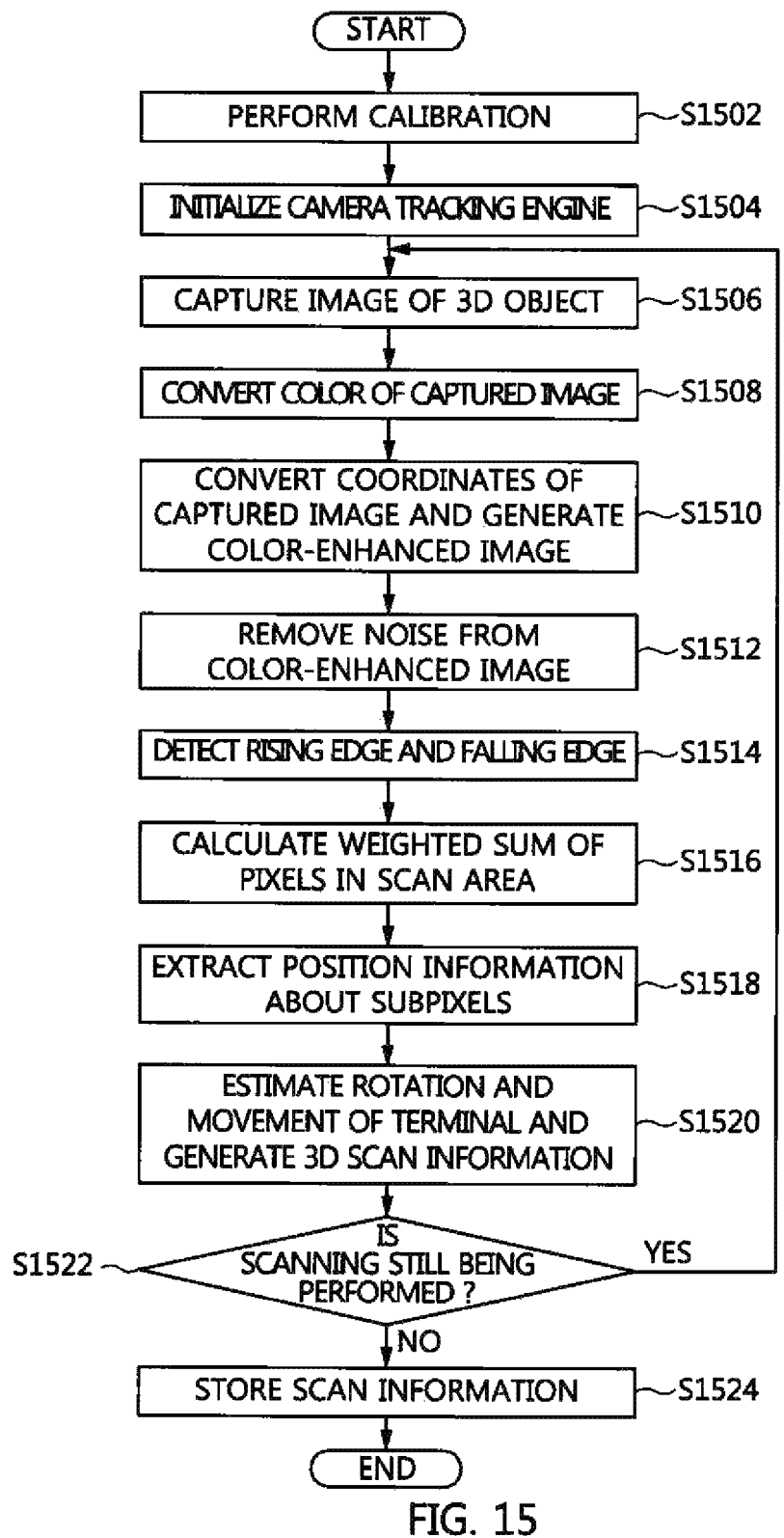
FIG. 15 is a flowchart specifically illustrating a 3D scanning method using lighting based on a smart phone according to an embodiment of the present invention.

FIG. 15 is a flowchart specifically illustrating a 3D scanning method using lighting based on a smart phone according to an embodiment of the present invention.

Referring to FIG. 15, in the 3D scanning method using lighting based on a smart phone according to an embodiment of the present invention, at least one of a camera and a lighting apparatus is calibrated based on a predetermined calibration board at step S1502.

Then, a camera tracking engine is initialized at step S1504.

In this case, because the calibration of the camera is performed independently, it is necessary to match the world coordinate system, represented by the camera tracking engine, with the scanning system, which is the world coordinate system of the camera. To this end, the process of initializing the camera tracking engine may be performed.

Subsequently, the image of the 3D object is captured based on the camera and the lighting apparatus at step S1506.

Subsequently, the color of the captured image is converted from RGB (Red, Green, Blue) format into YUV (Y, Cb, Cr) format at step S1508.

Subsequently, a color-enhanced image is generated by converting the coordinates of the captured image based on the UV coordinates at step S1510.

For example, if the color-enhanced image is a red-enhanced image, the pixels of the image may have values closer to 1 as being closer to red, whereas the pixels may have values closer to 0 as being further from red.

Subsequently, noise is removed from the color-enhanced image using a noise rejection filter at step S1512.

Subsequently, a rising edge and a falling edge are detected in the color-enhanced image based on two kinds of one-dimensional Gaussian circuits at step S1514.

Subsequently, a scan area is extracted from the area between the rising edge and the falling edge in the color-enhanced image, and multiple subpixels are extracted by calculating the weighted sum of the multiple pixels corresponding to the scan area at step S1516.

Subsequently, position information about the multiple subpixels is extracted at step S1518.

Subsequently, the rotation and movement of the terminal are estimated based on the change in the image, which occurs due to the movement of the terminal, and information about the sensor, and 3D scanning information is generated based on the estimated value at step S1520.

Subsequently, it is determined whether 3D scanning is still being performed at step S1522.

If it is determined at step S1522 that 3D scanning is still being performed, the image of the 3D object may be captured again using the camera.

Conversely, if it is determined at step S1522 that 3D scanning is not being performed, it may be determined that 3D scanning has been terminated, and the scanned information may be stored in the storage module at step S1524.

According to the present invention, a 3D scanning method that is easy for laypersons may be provided by enabling a user to freely capture the image of a 3D object in any direction using a camera and a lighting apparatus, installed in a smart phone.

Also, because the present invention provides a 3D scanning apparatus based on laser optical scanning using an inexpensive lighting apparatus, scanning data may be acquired at lower cost than when using existing technology.

Also, the present invention may improve the convenience of a 3D scanning apparatus by using a common camera tracking engine, which is easily replaceable.

As described above, a 3D scanning apparatus and method using light based on a smart phone according to the present invention are not limitedly applied to the configurations and operations of the above-described embodiments, but all or some of the embodiments may be selectively combined and configured so that the embodiments may be modified in various ways.

What is claimed is:

1. A three-dimensional (3D) scanning apparatus using lighting based on a smart phone, comprising:
    at least one hardware processor and a storage;
    an image capturing unit which is loaded on the at least one hardware processor and captures an image of a 3D object based on a camera and a lighting apparatus which are installed in a terminal;
    an image processing unit which is loaded on the at least one hardware processor and generates a color-enhanced image corresponding to light, emitted by the lighting apparatus, based on the captured image of the 3D object, and extracts position information corresponding to a scan area based on the color-enhanced image; and
    a tracking engine unit which is loaded on the at least one hardware processor and estimates rotation and movement of the terminal by combining one or more of information about a sensor of the terminal and a change in the image, which occurs in response to movement of the camera and the lighting apparatus,
    wherein the image processing unit generates the color-enhanced image, in which, among colors included in the captured image, a single color corresponding to the light is enhanced, by performing color model conversion for the colors of the captured image based on a characteristic of the light.

2. The 3D scanning apparatus of claim 1, wherein the image processing unit extracts multiple subpixels corresponding to the scan area from multiple pixels corresponding to the light in the color-enhanced image and extracts position information corresponding to the multiple subpixels.

3. The 3D scanning apparatus of claim 2, wherein the image processing unit detects a rising edge and a falling edge in the color-enhanced image based on two kinds of one-dimensional Gaussian circuits, and extracts the multiple subpixels from the multiple pixels by calculating a weighted sum of pixels included in an area satisfying a predetermined condition between the rising edge and the falling edge.

4. The 3D scanning apparatus of claim 1, wherein the image capturing unit comprises:
    a calibration unit for calibrating at least one of the camera and the lighting apparatus based on a predetermined calibration board; and
    a camera tracking adjustment unit for adjusting a coordinate system of a camera tracking engine to match a coordinate system of the camera on which the calibration has been performed.

5. The 3D scanning apparatus of claim 4, wherein the calibration unit estimates a marker plane of the predetermined calibration board based on at least one of an image, obtained by capturing the predetermined calibration board along with the light using the camera, and a camera parameter, obtained by calibrating the camera, and estimates a plane equation corresponding to the light based on the marker plane.

6. The 3D scanning apparatus of claim 4, wherein the tracking engine unit consecutively outputs a parameter corresponding to at least one of a position and a posture of the terminal in 3D space by combining the captured image with the information about the sensor of the terminal while the moving terminal captures the image of the 3D object.

7. The 3D scanning apparatus of claim 1, wherein the image processing unit removes noise from the color-enhanced image using a noise rejection filter.

8. The 3D scanning apparatus of claim 1, wherein the light is used diversely based on at least one of a type of the single color and a shape of the light depending on a kind of the lighting apparatus.

9. A 3D scanning method using lighting based on a smart phone, comprising:
    capturing an image of a 3D object based on a camera and a lighting apparatus which are installed in a terminal;
    generating a color-enhanced image corresponding to light, emitted by the lighting apparatus, based on the captured image of the 3D object, and extracting position information corresponding to a scan area based on the color-enhanced image; and
    estimating rotation and movement of the terminal by combining one or more of information about a sensor of the terminal and a change of the image, which occurs in response to movement of the camera and the lighting apparatus,
    wherein extracting the position information is configured to generate the color-enhanced image, in which, among colors included in the captured image, a single color corresponding to the light is enhanced, by performing color model conversion for the colors of the captured image based on a characteristic of the light.

10. The 3D scanning method of claim 9, wherein extracting the position information comprises:
    extracting multiple subpixels corresponding to the scan area from multiple pixels corresponding to the light in the color-enhanced image; and
    extracting position information corresponding to the multiple subpixels.

11. The 3D scanning method of claim 10, wherein extracting the multiple subpixels comprises:
    detecting a rising edge and a falling edge in the color-enhanced image based on two kinds of one-dimensional Gaussian circuits; and
    extracting the multiple subpixels from the multiple pixels by calculating a weighted sum of pixels included in an area satisfying a predetermined condition between the rising edge and the falling edge.

12. The 3D scanning method of claim 9, wherein capturing the image of the 3D object comprises:

calibrating at least one of the camera and the lighting apparatus based on a predetermined calibration board; and adjusting a coordinate system of a camera tracking engine to match a coordinate system of the camera on which the calibration has been performed.

13. The 3D scanning method of claim 12, wherein calibrating at least one of the camera and the lighting apparatus comprises:

estimating a marker plane of the predetermined calibration board based on at least one of an image, obtained by capturing the predetermined calibration board along with the light using the camera, and a camera parameter, obtained by calibrating the camera; and estimating a plane equation corresponding to the light based on the marker plane.

14. The 3D scanning method of claim 12, wherein estimating the rotation and the movement of the terminal is configured to output a parameter corresponding to at least one of a position and a posture of the terminal in 3D space by combining the captured image with the information about the sensor of the terminal while the moving terminal captures the image of the 3D object.

15. The 3D scanning method of claim 9, wherein extracting the position information comprises removing noise from the color-enhanced image using a noise rejection filter.

16. The 3D scanning method of claim 9, wherein the light is used diversely based on at least one a type of the single color and a shape of the light depending on a kind of the lighting apparatus.

* * * * *